(12) United States Patent
Albertelli et al.

(10) Patent No.: US 11,122,848 B2
(45) Date of Patent: Sep. 21, 2021

(54) PROTECTIVE HEADWEAR

(71) Applicants: Aldino Albertelli, London (GB); Riccardo Cioni, Pisa (IT)

(72) Inventors: Aldino Albertelli, London (GB); Riccardo Cioni, Pisa (IT)

(*) Notice: Subject to any disclaimer, the term of this patent is extended or adjusted under 35 U.S.C. 154(b) by 256 days.

(21) Appl. No.: 14/888,120

(22) PCT Filed: Apr. 30, 2014

(86) PCT No.: PCT/GB2014/051351
§ 371 (c)(1),
(2) Date: Oct. 30, 2015

(87) PCT Pub. No.: WO2014/177872
PCT Pub. Date: Nov. 6, 2014

(65) Prior Publication Data
US 2016/0058092 A1    Mar. 3, 2016

(30) Foreign Application Priority Data

Apr. 30, 2013    (GB) .................................... 1307815

(51) Int. Cl.
| | |
|---|---|
| *A42B 3/04* | (2006.01) |
| *A42B 3/06* | (2006.01) |
| *A42B 3/12* | (2006.01) |
| *H04Q 9/00* | (2006.01) |

(52) U.S. Cl.
CPC .............. *A42B 3/046* (2013.01); *A42B 3/068* (2013.01); *A42B 3/124* (2013.01); *A42B 3/128* (2013.01); *H04Q 9/00* (2013.01); *H04Q 2209/40* (2013.01)

(58) Field of Classification Search
CPC ......... A42B 3/046; A42B 3/124; A42B 3/128; H04Q 9/00
USPC ............................................................. 2/412
See application file for complete search history.

(56) References Cited

U.S. PATENT DOCUMENTS

| | | | |
|---|---|---|---|
| 3,877,076 A | 4/1975 | Summers | |
| 4,558,470 A * | 12/1985 | Mitchell ................ | A42B 3/124 2/414 |
| 5,056,162 A * | 10/1991 | Tirums ................... | A42B 3/125 2/412 |

(Continued)

FOREIGN PATENT DOCUMENTS

| | | |
|---|---|---|
| EP | 0881064 | 12/1998 |
| EP | 2550886 A1 | 1/2013 |

(Continued)

OTHER PUBLICATIONS

International Search Report dated Oct. 2, 2014.
(Continued)

*Primary Examiner* — Timothy K Trieu
(74) *Attorney, Agent, or Firm* — Ryan T. Grace; Advent, LLP (57) ABSTRACT

A helmet (10) comprising (i) an outer shell (12); (ii) an inner pad (14) configured to deform resiliently to cushion the head of a user; and (iii) a solid open-cell foam material (18) wherein the outer shell is spaced apart from the inner pad by the solid open-cell foam material and wherein the solid open-cell foam material is arranged to deform irreversibly in the event of an impact which applies a pressure greater than a selected threshold pressure to absorb the energy of the impact.

23 Claims, 3 Drawing Sheets

(56) References Cited

U.S. PATENT DOCUMENTS

| | | | | |
|---|---|---|---|---|
| 6,070,271 | A * | 6/2000 | Williams | A42B 3/066 2/412 |
| 9,032,558 | B2 * | 5/2015 | Leon | A42B 3/12 2/411 |
| 9,498,014 | B2 * | 11/2016 | Princip | A42B 3/064 |
| 2007/0209098 | A1 * | 9/2007 | Peart | A42B 3/124 2/410 |
| 2010/0186150 | A1 * | 7/2010 | Ferrara | A42B 3/128 2/412 |
| 2011/0107503 | A1 * | 5/2011 | Morgan | F41H 1/08 2/456 |
| 2011/0307997 | A1 * | 12/2011 | Blair | A42B 1/08 2/414 |
| 2012/0017358 | A1 * | 1/2012 | Princip | A42B 3/065 2/414 |
| 2012/0188083 | A1 | 7/2012 | Miller, II | |
| 2012/0198604 | A1 * | 8/2012 | Weber | A42B 3/125 2/414 |
| 2012/0210498 | A1 * | 8/2012 | Mack | A42B 3/0466 2/414 |
| 2012/0304767 | A1 | 12/2012 | Howard et al. | |
| 2013/0061371 | A1 * | 3/2013 | Phipps | A42B 3/064 2/411 |
| 2013/0232668 | A1 * | 9/2013 | Suddaby | A42B 3/064 2/413 |
| 2013/0273341 | A1 * | 10/2013 | Albertelli | B32B 5/32 428/218 |

FOREIGN PATENT DOCUMENTS

| | | |
|---|---|---|
| FR | 2346992 | 11/1977 |
| FR | 2561877 | 3/1984 |
| FR | 2566632 | 7/1984 |
| GB | 982698 | 2/1965 |
| GB | 2482030 A | 1/2012 |
| JP | 3008458 B2 | 2/2000 |
| JP | 3094424 B2 | 10/2000 |
| JP | 2010148718 A | 7/2010 |
| JP | 2011506782 A | 3/2011 |
| WO | 2004014168 A2 | 2/2004 |

OTHER PUBLICATIONS

United Kingdom Search Report dated Oct. 29, 2013.
GB Examination Report dated Oct. 25, 2017 for App. No. GB1307815.9.

* cited by examiner

Inset A-A

PROTECTIVE HEADWEAR

This invention relates in general to protective headwear. More specifically, the present invention relates to helmets adapted to provide protection against impacts to the head of a user, and to inserts for helmets.

Protective headwear is used in a variety of sporting, industrial and military environments. For instance, protective helmets are routinely used in a number of different sports, such as American football, ice hockey, field hockey, lacrosse, baseball, cycling, motorsports, downhill skiing and snowboarding, where there is a risk of traumatic brain injury due to impacts to the head.

Traumatic brain injuries occur when sudden acceleration or deceleration of the head causes linear, rotational or angular movement of the brain within the skull, leading to damage to brain cells, blood vessels and protective tissues. Symptoms of mild traumatic brain injury (concussion) typically include loss of consciousness, headache, nausea, dizziness, drowsiness and temporary cognitive impairment, whereas more severe traumatic brain injuries can lead to permanent cognitive impairment, behavioural and emotional changes, and an increased risk of stroke and degenerative brain disorders. In particular, chronic traumatic encephalopathy (CTE) is a progressive neurodegenerative disease that is found mainly in professional athletes with a history of multiple concussions, and that causes depression and suicidality, cognitive dysfunction and aggression.

Studies have shown that the G-force threshold for concussions is generally about 70 to 85 G, although it will be appreciated that this highly dependent on the individual in question, and the type of impact. Impacts in sports such as American football tend to range from 20 to 180 G, and even as high as 200 G. By way of reference, a pilot in a jet fighter generally has to withstand a maximum of 4.5 G and a car crash at 25 miles per hour tends to create about 100 G.

The risk of traumatic brain injuries is a particular concern in full-contact sports, such as American football, ice hockey or lacrosse, in which athletes collide with each other and the ground with great force within the rules of the sport. It is estimated that professional American football players may receive as many as 1,500 blows to the head during a single season, and 15,000 over a 10 year playing career, depending on their position. Numerous cases of CTE have been diagnosed post-mortem in former professional American football players, often following suicide. Even high school American football players have been found to receive around 650 impacts to the head each season, and at least 50 high school or younger athletes are reported to have died from head injuries on the field of play between 1997 and 2007 in the US alone.

Given that the average weight of a player in the NFL has grown by at least 10 percent since the 1980's to about 248 pounds there are clearly many potential instances where concussion may occur. Further, the heaviest position, offensive tackle, went from about 280 pounds two decades ago to about 320 pounds.

There is accordingly a need for measures to reduce the incidence and severity of head injuries. While changes to playing and training practices can go some way to addressing the risk of injury, there is also a need for more effective head protection which is effective to absorb impacts to the head, especially those likely to cause concussion, and thereby reduce the likelihood of a traumatic brain injury.

There is also a need for head protection that incorporates electronic monitoring apparatus to determine the frequency of impacts to the head, as well as the force and direction of the impacts. Accumulated data may be monitored by sports specialists, such as doctors, so as to identify individuals at high risk of brain injury and to determine the need for intervention (medical or otherwise) and/or appropriate recovery periods.

It is especially beneficial for activities such as contact sports, to be able to assess, in real time, the status of the protective helmet after an impact or a series of impacts, in order to ascertain whether parts of the helmet require replacement and to seek to avoid injuries due to an inefficient protective headwear Accordingly, in a first aspect, the present invention provides a helmet comprising:
  (i) an outer shell;
  (ii) an inner pad configured to deform resiliently to cushion the head of a user; and
  (iii) a solid open-cell structure
wherein the outer shell is spaced apart from the inner pad by the solid open-cell structure and wherein the solid open-cell structure is arranged to deform irreversibly in the event of an impact which applies a pressure greater than a selected threshold pressure to absorb the energy of the impact.

In the event of an impact to the head of an individual wearing a helmet according to the present invention, impact forces that would otherwise impact on the head of the individual, are instead dissipated by the irreversible deformation of the solid open-cell structure. It will be appreciated that the threshold is selected to be at a level so as to prevent brain injuries such as concussion. By way of example, the threshold may be at 70 G so that any impact above 70 G results in at least some permanent deformation of the solid open-cell structure, thus limiting the intensity of the impact as transmitted to the head.

In a preferred embodiment, the open-cell structure is an open-cell foam material.

In a preferred embodiment, the open-cell structure, preferably a foam, is able to dissipate impacts of at least 70 G and preferably up to at least 200 G, for example 80 G, 90 G, 100 G, 110 G, 120 G, 130 G, 140 G, 150 G, 160 G, 170 G, 180 G and 190 G.

In preferred embodiments, the solid open-cell structure is frangible and preferably deforms irreversibly by crushing or crumbling.

The terms crushing and/or crumbling are intended to include the disintegration of the open-cell structure into particles and/or powder. By way of example, the rigid open-cell foam material may, upon passing of the threshold pressure, be crushed such that the cells of the material break into particles. Such disintegration is generally in a controlled manner, such as from an upper surface of the material in a direction of a lower surface, for example along a density gradient.

The solid open-cell structure is preferably substantially rigid. By substantially rigid, it is meant that the solid open-cell structure is resistant to deflection under load and does not collapse under moderate pressure.

The solid open-cell foam material may suitably be selected from polymeric foam materials. Examples of suitable solid open-cell foam polymeric materials include phenolic resin foams, polystyrene foams, polyurethane foams, polyethylene foams, polyvinylchloride foams, polyvinylacetate foams, polyester foams polyether foams, and foam rubber. Preferred solid open-cell foam materials are phenolic resin foams.

A particular advantage of using open-cell foams such as phenolic resin foams is that they are transparent to electromagnetic waves. In this way, such materials are highly compatible with the use of, for example, RFID accelerometers and others types of sensors. The solid open-cell foam may include a finely-divided particulate reinforcing material. Suitable particulate reinforcing materials are preferably inert and insoluble. The reinforcing material may be present in an amount of up to 50 weight percent based on the total weight of the foam, for example from 2 to 40 weight percent, or 5 to 20 weight percent, including 10 weight percent, based on the total weight of the foam. Suitable reinforcing materials include organic or inorganic (including metallic) particulate materials, which may be crystalline or amorphous. Even fibrous solids have been found to be effective, although not preferred. Non-limiting examples of suitable particulate materials include clays, clay minerals, talc, vermiculite, metal oxides, refractories, solid or hollow glass microspheres, fly ash, coal dust, wood flour, grain flour, nut shell flour, silica, mineral fibres such as finely chopped glass fibre and finely divided asbestos, chopped fibres, finely chopped natural or synthetic fibres, ground plastics and resins whether in the form of powder or fibres, e.g. reclaimed waste plastics and resins, pigments such as powdered paint and carbon black, and starches.

Preferably the solid open-cell foam has a density in the range of 100 to 500 $kg·m^{-3}$, more preferably 120 to 400 $kg·m^{-3}$, and most preferably 120 to 250 $kg·m^{-3}$.

The physical properties of such foams, especially the compressive strength and deformation under impact are believed to be related to (amongst other factors) cell wall thickness and average cell diameter. Preferably, the average cell diameter of the solid open-cell foam is in the range of about 0.5 mm to 5 mm, more preferably 0.5 or 1 mm to 2 or 3 mm.

The solid open-cell structure, for example foam material, may form a continuous layer extending across the entire area between the outer casing and the inner pad of the helmet. However, in preferred embodiments, the solid open-cell structure, preferably foam material, is provided as a discontinuous layer. For instance, the outer casing and the inner pad of the helmet may be spaced apart by a plurality of strips and/or pillars of the solid open-cell structure, for example foam material. In some embodiments, it is preferred that the outer casing and the inner pad of the helmet are spaced apart by a plurality of pillars of the solid open-cell structure, for example foam material.

Where the outer casing and the inner pad of the helmet are spaced apart by a plurality of pillars of the solid open-cell foam material, the cross-sectional area of the pillars may be selected according to the breaking stress of the solid open-cell foam material and the selected threshold pressure. By way of example, the cross-sectional area may be selected such that the threshold is for impacts at 70 G.

The cross-sectional area of the pillars may be selected so as to be substantially constant between an outer end adjacent to the outer casing and the inner end adjacent to the inner pad. In other embodiments, the cross-sectional area of the pillars may change between the inner end and the outer end of the pillars. For example, one or more of the pillars may have a larger cross-section at the inner end than at the outer end. In this way, it is possible for the pillars to dissipate impacts ranging from 70 to 200 G.

For instance, the pillars may be trapezoidal, such as conical, truncated conical, pyramidal or truncated pyramidal. In this way, the pillars may undergo progressive deformation under an impact. Thus, one or more of the pillars may have more than one threshold pressure, such that a portion of the pillar is deformed at lower impact pressures and such that deformation is more extensive as the impact pressure is increased.

In other embodiments, the helmet of the invention may comprise a plurality of pillars wherein different pillars have a different threshold pressure. Thus, the threshold at which the solid open-cell foam undergoes irreversible deformation may be different for different areas of the helmet. In this way, it is possible to tailor the thresholds according to the part of a wearer's head that is being protected. This is particularly important as different parts of the head have greater susceptibility to impacts.

In further embodiments, the solid open-cell foam material may comprise a plurality of portions, for example a first portion and a second portion, wherein the first portion has a lower threshold pressure to the second portion and wherein the first and second portions are stacked together. In this way, the first portion of the solid open-cell foam material undergoes irreversible deformation at lower impact pressures, whereas the second portion of the solid open-cell foam material only undergoes irreversible deformation in more severe impacts. By way of example, the separate materials may have threshold to dissipate impacts at 70 G and 140 G.

It is preferred that there are one or more void zones between the outer casing and the inner pad. The presence of void zones not only reduces the weight of the helmet, but also improves the impact resistance of the helmet since the solid open-cell foam material may be displaced into the void areas on impact as the material undergoes irreversible deformation. As described above, voids may be provided by the use of a discontinuous layer of the solid open-cell foam material. Alternatively, the solid open cell foam may itself be provided with one or more cavities, wherein the size and/or spatial distribution of the one or more cavities is selected according to the breaking stress of the impact-absorbing material and the selected threshold pressure.

It will be appreciated that the one or more cavities in the solid open cell foam may also be used to modify the breaking stress of the impact absorbing material.

The total area of all void zones in the helmet may depend on the end use of the helmet and the selected threshold pressure. It will be appreciated by the skilled person that as the total area of the voids is increased relative to the surface area of the users head, the impact resistance of the helmet is reduced and thus a more resilient solid open-cell foam may be required. It will be appreciated that too great a void area may reduce the distribution of an impact across the head of the user and thus may increase the risk of local injury. Accordingly it is preferred that the total area of void zones is less than 50% of the total area of the inner pad, more preferably less than 60% of the total area of the inner pad, and most preferably less than 70% of the total area of the inner pad.

The inner pad of the helmet is configured to deform resiliently in response to an impact, and may be formed from any suitable material. Preferably, the material is lightweight and has high impact absorbance. Suitable materials include elastic materials, including soft foams, such as those formed from expanded polypropylene, expanded polyethylene or expanded polyurethane.

The inner pad is generally suitable for absorbing impacts below the selected threshold pressure, such as those incurred at 20 to 70 G. Preferably, the inner pad also provides some impact protection above the selected threshold pressure. However, it will be appreciated that it is intended for the solid open-cell material to dissipate much of the energy produced from an impact of 70 G or above.

The inner pad may further comprise an outer lining so as to provide comfort to the wearer of the helmet. Suitable materials include lightweight synthetic foams and/or fabrics. It will be appreciated that such materials are intended to be skin comfortable and may also aid in dissipation of perspiration and/or heat. The inner pad may optionally be provided with holes and/or vents so as to aid in the dissipation of perspiration and/or heat.

The inner pad is preferably adapted or adaptable to the shape of a user's head. Suitably, the inner pad forms a substantially continuous inner surface of the helmet and is adapted to cover the head of the user to such an extent as is usual for helmets of the selected type.

Preferably, the outer casing forms an outer shell of the helmet. The outer shell typically provides strength and rigidity to the helmet. In preferred embodiments, the outer shell is made from a rigid material such as a rigid thermoplastic material. Examples of suitable rigid thermoplastics include polyethylene, polyamides, polycarbonates or any other suitable thermoplastic material.

The outer shell is intended to remain intact at all times and therefore must be capable of withstanding impacts of greater than 200 G.

The outer shell may suitably comprise a plurality of ventilation holes, allowing air to circulate around the user's head, thereby facilitating the dissipation of perspiration and heat.

The outer shell of the helmet may be shaped according to the requirements of the end user. For instance, in full-contact sports and motor sports, the outer shell of the helmet may be shaped so as to cover substantially all of the head with the exception of the face. For other sports a different shape of the helmet may be appropriate, for example one which covers only the top part of the head, for example as commonly seen in cycling helmets.

The helmet preferably also comprises fastening means to help retain it on the head of a user, especially in use. Such means may include a chin strap which may be formed from any suitable materials. The helmet may optionally be provided with a faceguard and/or visor.

In some embodiments the helmet comprises a sensor adapted to sense impacts, and a communication interface adapted to communicate impact data to a remote device. The helmet may further comprise a controller adapted to send a signal to the remote device in the event of an impact which applies a pressure greater than a selected threshold pressure. The helmet may further comprise a data recorder operable to record data from the sensor.

Sensors may be provided in the casing of a helmet, and these sensors may be arranged to conform to the shape of the helmet. For example, these conformal sensors may comprise conductive materials arranged so that the resistivity of the material is modified by impacts so that the resitivity of the material provides an indication of impacts suffered by the helmet. In addition, accelerometers may be used that are arranged to break a circuit, for example by a conductive link being broken by an impact. Such configurations may be used to detune (e.g. modify the resonant frequency of) resonant circuits. This may enable the status of the helmet to be established by measuring the degree of inductive coupling and/or RF reflectance of the helmet.

Accordingly, in an aspect there is provided a helmet comprising an RF antenna for coupling with an RF electromagnetic field, and an impact sensor arranged to modify the electrical characteristics of the RF antenna in the event that the acceleration of the helmet exceeds a selected threshold value.

Modifying the electrical characteristics may comprise coupling or decoupling a resistive, inductive or capacitive load to the antenna.

In an embodiment the impact sensor comprises an inertial mechanical accelerometer electrically coupled to the antenna and configured to be deflected in response to accelerations of the helmet. The accelerometer may be arranged to break in the event that the acceleration of the helmet exceeds a selected threshold value.

In an embodiment the sensor may be arranged to detune the RF antenna by changing the impedance of the antenna. For example the sensor may be configured to electrically decouple one of an inductance or a capacitance from the RF antenna.

In an embodiment the mechanical element is arranged to break in the event that the acceleration of the helmet exceeds the selected threshold value. The antenna may comprise an inductive coupler for coupling to an RF H-field produced by another inductive coupler in near field range.

In an embodiment the sensor comprises a resistive element, having a resistivity which changes in response to accelerations of the resistive element. The resistive element may be coupled to the antenna to modify the loading of the antenna in response to impacts.

It will be appreciated that the recorded data may be used to monitoring the impacts being received by wearers of a helmet in accordance with the present invention. By way of example, it is possible to monitor impacts to provide guidance as to whether a wearer has received an impact large enough to possibly cause issues such as concussion. Alternatively, or in addition, it is possible to monitor the number of impacts to provide guidance as to whether the cumulative impacts are sufficient to cause issues such as concussion. Such monitoring may be undertaken in real time so as to provide immediate results and analysis.

In an aspect, the present invention provides a helmet system comprising:
(i) a helmet comprising an outer casing, and optionally an inner pad positioned inside the casing, wherein the inner pad is configured to deform resiliently to cushion the head of a user; and
(ii) a removable insert adapted to be inserted between the outer casing and the head of a user, wherein the removable insert comprises or consists of a solid opencell foam material arranged to deform irreversibly in the event of an impact which applies a pressure greater than a selected threshold pressure to absorb the energy of the impact.

Where the inner pad is present and positioned inside the casing, the removable insert is adapted to be inserted between the outer casing and the inner pad.

In a further embodiment, the removable insert further comprises a pad configured to deform resiliently to cushion the head of a user. In such an embodiment, when the insert is inserted into the outer casing, the pad forms an inner layer sandwiching the solid open-cell foam with the casing.

Suitable materials and/or examples are those such as defined above.

In preferred embodiments, the outer casing of the helmet comprises a keyed inner surface, and the removable insert comprises a complementary keying feature adapted to engage with the keyed inner surface to inhibit sliding of the removable insert with respect to the helmet.

In some embodiment the helmet comprises a keyed inner surface, and the insert comprises a complementary keying feature adapted to engage with the keyed inner surface. In this way, sliding of the removable insert with respect to the helmet may be inhibited.

The removable insert may comprise a sensor configured to sense impacts, and a coupling (such as a communication interface) for communicating signals from the sensor.

The helmet may comprise a sensor for sensing impacts, and a coupling (such as a communication interface) for communicating signals between the sensor and a coupling of the removable insert. The coupling may be arranged with respect to the keying of the helmet and the removable insert so that engaging the keying feature of the insert with the inner surface of the helmet arranges the coupling for communication between the helmet and the removable insert. The coupling may be selected from the group consisting of a conductive coupling, an inductive coupling, and a capacitive coupling.

In some embodiments, the helmet may further comprise a controller operable to obtain sensor data from at least one sensor of the insert via the coupling, and a communication interface for communicating sensor data with a remote device.

In further embodiments, the removable insert may comprise a data recorder for recording impacts applied to the insert. The helmet may comprise a controller configured to obtain data from the data recorder in response to the removable insert being coupled to the helmet, wherein the controller is configured to trigger an alert based on the obtained data. For example if the sensor data indicates that the insert has been subjected to an impact greater than the selected threshold pressure. The alert may suitably be an audible alert, a visual alert, or a radio frequency signal. Thus, the helmet and/or the insert may comprise a radio frequency antenna for transmitting radio frequency signals from the helmet to a remote device.

In accordance with the present invention, there is also disclosed an insert suitable for use with a helmet casing, wherein the insert is as defined above.

A further embodiment of the present invention provides a method of reducing impact energy transfer comprising use of a helmet as defined above.

Still yet a further embodiment provides a method of monitoring impact energy transfer comprising use of a helmet as defined above.

As noted above, in aspects of the present invention, a suitable solid open-cell foam is a solid open-cell phenolic resin foam. A particularly suitable foam may be produced by way of a curing reaction between:
 (a) a liquid phenolic resole having a reactivity number (as defined below) of at least 1; and
 (b) a strong acid hardener for the resole; optionally in the presence of:
 (c) a finely divided inert and insoluble particulate solid which is present, where used, in an amount of at least 5% by weight of the liquid resole and is substantially uniformly dispersed through the mixture containing resole and hardener;

the temperature of the mixture containing resole and hardener due to applied heat not exceeding 85° C. and the said temperature and the concentration of the acid hardener being such that compounds generated as by-products of the curing reaction are volatilised within the mixture before the mixture sets such that a foamed phenolic resin product is produced.

By a phenolic resole is meant a solution in a suitable solvent of an acid-curable prepolymer composition prepared by condensation of at least one phenolic compound with at least one aldehyde, usually in the presence of an alkaline catalyst such as sodium hydroxide.

Examples of phenols that may be employed are phenol itself and substituted, usually alkyl substituted, derivatives thereof, with the condition that that the three positions on the phenolic benzene ring ortho- and para- to the phenolic hydroxyl group are unsubstituted. Mixtures of such phenols may also be used. Mixtures of one or more than one of such phenols with substituted phenols in which one of the ortho or para positions has been substituted may also be employed where an improvement in the flow characteristics of the resole is required. However, in this case the degree of cross-linking of the cured phenolic resin foam will be reduced. Phenol itself is generally preferred as the phenol component for economic reasons.

The aldehyde will generally be formaldehyde although the use of higher molecular weight aldehydes is not excluded.

The phenol/aldehyde condensation product component of the resole is suitably formed by reaction of the phenol with at least 1 mole of formaldehyde per mole of the phenol, the formaldehyde being generally provided as a solution in water, e.g. as formalin. It is preferred to use a molar ratio of formaldehyde to phenol of at least 1.25 to 1 but ratios above 2.5 to 1 are preferably avoided. The most preferred range is 1.4 to 2.0 to 1.

The mixture may also contain a compound having two active hydrogen atoms (dihydric compound) that will react with the phenol/aldehyde reaction product of the resole during the curing step to reduce the density of cross-linking. Preferred dihydric compounds are diols, especially alkylene diols or diols in which the chain of atoms between the hydroxy groups contains not only methylene and/or alkyl-substituted methylene groups but also one or more heteroatoms, especially oxygen atoms. Suitable diols include ethylene glycol, propylene glycol, propane-1,3-diol, butane-1,4-diol and neopentyl glycol. Particularly preferred diols are poly-, especially di-(alkylene ether) diols, for example diethylene glycol and, especially, dipropylene glycol.

Preferably the dihydric compound is present in an amount of from 0 to 35% by weight, more preferably 0 to 25% by weight, based on the weight of phenol/aldehyde condensation product. Most preferably, the dihydric compound, when used, is present in an amount of from 5 to 15% by weight based on the weight of phenol/aldehyde condensation product. When such resoles containing dihydric compounds are employed in the present process, products having a particularly good combination of physical properties, especially strength, can be obtained.

Suitably, the dihydric compound is added to the formed resole and preferably has 2 to 6 atoms between OH groups.

The resole may comprise a solution of the phenol/aldehyde reaction product in water or in any other suitable solvent or in a solvent mixture, which may or may not include water.

Where water is used as the sole solvent, it is preferably present in an amount of from 15 to 35% by weight of the resole, preferably 20 to 30%. Of course the water content may be substantially less if it is used in conjunction with a cosolvent, e.g. an alcohol or one of the above-mentioned dihydric compounds where used.

As indicated above, the liquid resole (i.e. the solution of phenol/aldehyde product optionally containing dihydric compound) must have a reactivity number of at least 1. The reactivity number is 10/x where x is the time in minutes required to harden the resole using 10% by weight of the resole of a 66 to 67% aqueous solution of p-toluene sulfonic acid at 60° C. The test involves mixing about 5 ml of the resole with the stated amount of the p-toluene sulfonic acid solution in a test tube, immersing the test tube in a water bath heated to 60° C. and measuring the time required for the mixture to become hard to the touch. The resole should have a reactivity number of at least 1 for useful foamed products to be produced and preferably the resole has a reactivity number of at least 5, most preferably at least 10.

The pH of the resole, which is generally alkaline, is preferably adjusted to about 7, if necessary, for use in the process, suitably by the addition of a weak organic acid such as lactic acid.

Examples of strong acid hardeners are inorganic acids such as hydrochloric acid, sulphuric acid and phosphoric acid, and strong organic acids such as aromatic sulphonic acids, e.g. toluene sulphonic acids, and trichloroacetic acid. Weak acids such as acetic acid and propionic acid are generally not suitable. The preferred hardeners for the process of the invention are the aromatic sulfonic acids, especially toluene sulfonic acids.

The acid may be used as a solution in a suitable solvent such as water.

When the mixture of resole, hardener and solid is to be poured, e.g. into a mould and in slush moulding applications, the amount of inert solid that can be added to the resole and hardener is determined by the viscosity of the mixture of resole and hardener in the absence of the solid. For these applications, it is preferred that the hardener is provided in a form, e.g. solution, such that when mixed with the resole in the required amount yields a liquid having an apparent viscosity not exceeding about 50 poises at the temperature at which the mixture is to be used, and the preferred range is 5 to 20 poises. Below 5 poises, the amount of solvent present tends to present difficulties during the curing reaction.

The curing reaction is exothermic and will therefore of itself cause the temperature of the mixture containing resole and acid hardener to increase. The temperature of the mixture may also be raised by applied heat, but the temperature to which said mixture may then be raised (that is, excluding the effect of any exotherm) preferably does not exceed 85° C. If the temperature of the mixture exceeds 85° C. before addition of the hardener, it is usually difficult or impossible thereafter to properly disperse the hardener through the mixture because of incipient curing. On the other hand, it is difficult, if not impossible, to uniformly heat the mixture above 85° C. after addition of the hardener.

Increasing the temperature towards 85° C. tends to lead to coarseness and non-uniformity of the texture of the foam but this can be offset at least to some extent at moderate temperatures by reducing the concentration of hardener. However at temperatures much above 75° C. even the minimum amount of hardener required to cause the composition to set is generally too much to avoid these disadvantages. Thus, temperatures above 75° C. are preferably avoided and preferred temperatures for most applications are from ambient temperature to about 75° C. The preferred temperature range usually depends to some extent on the nature of the particulate solid, where used. For most solids the preferred temperature range is from 25 to 65° C., but for some solids, in particular wood flour and grain flour, the preferred temperature range is 25 to 75° C. The most preferred temperature range is 30 to 50° C. Temperatures below ambient, e.g. down to 10° C. can be used if desired, but no advantage is usually gained thereby. In general, at temperatures up to 75° C., increase in temperature leads to decrease in the density of the foam and vice versa.

The amount of hardener present also affects the nature of the product as well as the rate of hardening. Thus, increasing the amount of hardener not only has the effect of reducing the time required to harden the composition, but above a certain level dependent on the temperature and nature of the resole it also tends to produce a less uniform cell structure. It also tends to increase the density of the foam because of the increase in the rate of hardening. In fact, if too high a concentration of hardener is used, the rate of hardening may be so rapid that no foaming occurs at all and under some conditions the reaction can become explosive because of the build up of gas inside a hardened shell of resin. The appropriate amount of hardener will depend primarily on the temperature of the mixture of resole and hardener prior to the commencement of the exothermic curing reaction and the reactivity number of the resole and will vary inversely with the chosen temperature and the reactivity number. The preferred range of hardener concentration is the equivalent of 2 to 20 parts by weight of p-toluene sulfonic acid per 100 parts by weight of phenol/aldehyde reaction product in the resole assuming that the resole has a substantially neutral reaction, i.e. a pH of about 7. By equivalent to p-toluene sulfonic acid, we mean the amount of hardener required to give substantially the same curing time as the stated amount of p-toluene sulfonic acid. The most suitable amount for any given temperature and combination of resole and finely divided solid is readily determinable by simple experiment. Where the preferred temperature range is 25 to 75° C. and the resole has a reactivity number of at least 10, the best results are generally obtained with the use of hardener in amounts equivalent to 3 to 10 parts of p-toluene sulfonic acid per 100 parts by weight of the phenol/aldehyde reaction product. For use with temperatures below 25° C. or resoles having a reactivity number below 10, it may be necessary to use more hardener.

By suitable control of the temperature and of the hardener concentration, the time lapse between adding the hardener to the resole and the composition becoming hard (referred to herein as the curing time) can be varied at will from a few seconds to up to an hour or even more, without substantially affecting the density and cell structure of the product.

Another factor that controls the amount of hardener required can be the nature of the inert solid, where present. Very few are exactly neutral and if the solid has an alkaline reaction, even if only very slight, more hardener may be required because of the tendency of the filler to neutralize it. It is therefore to be understood that the preferred values for hardener concentration given above do not take into account any such effect of the solid. Any adjustment required because of the nature of the solid will depend on the amount of solid used and can be determined by simple experiment.

The exothermic curing reaction of the resole and acid hardener leads to the formation of by-products, particularly aldehyde and water, which are at least partially volatilised.

The curing reaction is effected in the presence of a finely divided inert and insoluble particulate solid which is substantially uniformly dispersed throughout the mixture of resole and hardener. By an inert solid we mean that in the quantity it is used it does not prevent the curing reaction.

It is believed that the finely divided particulate solid provides nuclei for the gas bubbles formed by the volatilisation of the small molecules, primarily formaldehyde and/or water, present in the resole and/or generated by the curing action, and provides sites at which bubble formation is promoted, thereby assisting uniformity of pore size. The presence of the finely divided solid may also promote stabilization of the individual bubbles and reduce the tendency of bubbles to agglomerate and eventually cause likelihood of bubble collapse prior to cure. To achieve the desired effect, the solid should be present in an amount of not less than 5% by weight based on the weight of the resole. Any finely divided particulate solid that is insoluble in the reaction mixture is suitable, provided it is inert. Examples of suitable particulate solids are provided above.

Solids having more than a slightly alkaline reaction, e.g. silicates and carbonates of alkali metals, are preferably avoided because of their tendency to react with the acid hardener. Solids such as talc, however, which have a very mild alkaline reaction, in some cases because of contamination with more strongly alkaline materials such as magnesite, are acceptable.

Some materials, especially fibrous materials such as wood flour, can be absorbent and it may therefore be necessary to use generally larger amounts of these materials than non-fibrous materials, to achieve valuable foamed products.

The solids preferably have a particle size in the range 0.5 to 800 microns. If the particle size is too great, the cell structure of the foam tends to become undesirably coarse. On the other hand, at very small particle sizes, the foams obtained tend to be rather dense. The preferred range is 1 to 100 microns, most preferably 2 to 40 microns. Uniformity of cell structure appears to be encouraged by uniformity of particle size. Mixtures of solids may be used if desired.

If desired, solids such as finely divided metal powders may be included which contribute to the volume of gas or vapour generated during the process. If used alone, however, it be understood that the residues they leave after the gas by decomposition or chemical reaction satisfy the requirements of the inert and insoluble finely divided particulate solid required by the process of the invention.

Preferably, the finely divided solid has a density that is not greatly different from that of the resole, so as to reduce the possibility of the finely divided solid tending to accumulate towards the bottom of the mixture after mixing.

In general, the maximum amount of solid that can be employed is controlled only by the physical problem of incorporating it into the mixture and handling the mixture. In general it is desired that the mixture is pourable but even at quite high solids concentrations, when the mixture is like a dough or paste and cannot be poured, foamed products with valuable properties can be obtained.

Other additives may be included in the foam-forming mixture; e.g. surfactants, such as anionic materials e.g. sodium salts of long chain alkyl benzene sulfonic acids, non-ionic materials such as those based on poly(ethyleneoxide) or copolymers thereof, and cationic materials such as long chain quaternary ammonium compounds or those based on polyacrylamides; viscosity modifiers such as alkyl cellulose especially methyl cellulose, and colorants such as dyes or pigments. Plasticisers for phenolic resins may also be included provided the curing and foaming reactions are not suppressed thereby, and polyfunctional compounds other than the dihydric compounds referred to above may be included which take part in the cross-linking reaction which occurs in curing; e.g. di- or poly-amines, di- or poly-isocyanates, di- or poly-carboxylic acids and aminoalcohols. Polymerisable unsaturated compounds may also be included possibly together with free-radical polymerisation initiators that are activated during the curing action e.g. acrylic monomers, so-called urethane acrylates, styrene, maleic acid and derivatives thereof, and mixtures thereof. The foam-forming compositions may also contain dehydrators, if desired.

Other resins may be included e.g. as prepolymers which are cured during the foaming and curing reaction or as powders, emulsions or dispersions. Examples are polyacetals such as polyvinyl acetals, vinyl polymers, olefin polymers, polyesters, acrylic polymers and styrene polymers, polyurethanes and prepolymers thereof and polyester prepolymers, as well as melamine resins, phenolic novolaks, etc. Conventional blowing agents may also be included to enhance the foaming reaction, e.g. low boiling organic compounds or compounds which decompose or react to produce gases.

Embodiments of the invention will now be described, purely by way of example, with reference to the accompanying drawings, in which:

FIGS. 4B-1 to 4B-4 each show a diagram of a section through a helmet liner according to the invention.

Figure 1:
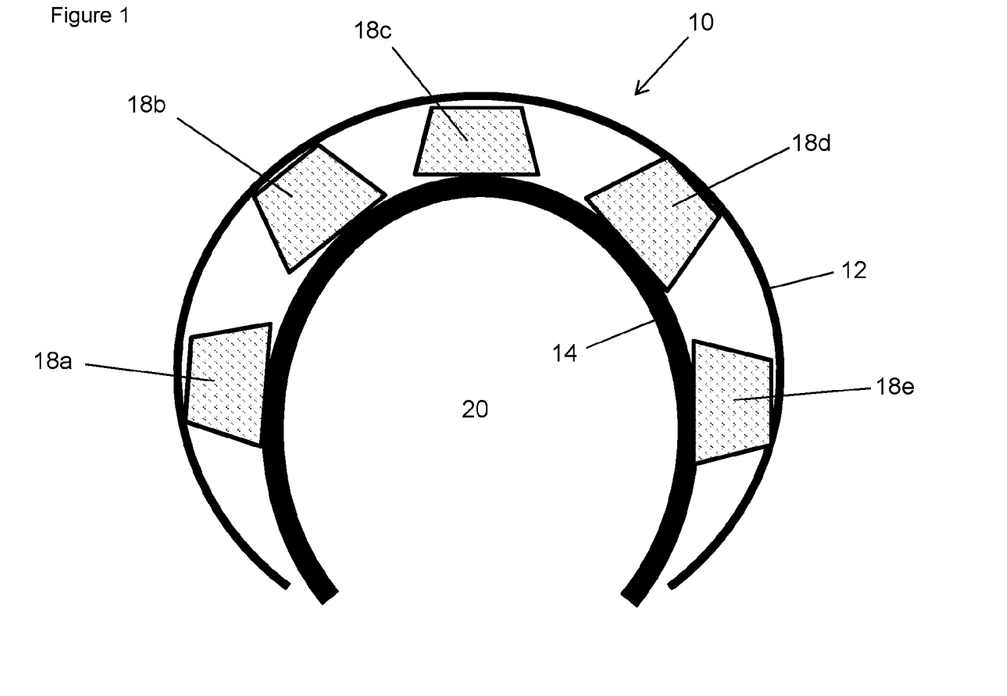
FIG. 1 is a diagrammatic view of a section through a helmet according to the invention.

FIG. 1 shows a helmet 10 comprising an outer shell 12, inner pad 14 and solid open-cell foam pillars 18a, 18b, 18c, 18d, and 18e. The outer shell 12, inner pad 14, and solid open-cell foam pillars 18a-18e are configured to surround a cavity 20 which is shaped to receive the head of a human wearer.

The outer shell 12 comprises a rigid material, and is shaped to surround and enclose the head of a user. The inner pad 14 comprises a material configured to deform resiliently to cushion the head from impacts striking the outer shell 12 of the helmet system 10. The pillars 18a, 18b, 18c, 18d, and 18e, are evenly distributed about the helmet system 10 to space the outer shell 12 from the inner pad 14, and to distribute the pressure of impacts which may be transmitted through the outer shell 12, thereby protecting the head of a wearer.

The pillars 18a, 18b, 18c, 18d, and 18e comprise frustoconical members of a solid rigid open-cell foam material. Accordingly, the pillars 18a, 18b, 18c, 18d, and 18e have a broad base, a narrower top face, and sloping sides. The pillars are arranged so that their broad bases are directed toward the cavity 20. The material of the pillars is frangible in that if placed under a compressive stress (pressure) that is greater than a selected threshold pressure or breaking stress, it will be crushed and crumble.

In FIG. 1, the pillars 18a, 18b, 18c, 18d, and 18e consist solely of a single open-cell material having a single threshold pressure, and so the frustoconical shape of the pillar means that the compressive force that is required to crush the top part of a pillar is less than that required to crush the broader parts of the pillar 18a to 18e nearer to its base.

The spatial distribution of the pillars, their cross sectional areas, and the threshold pressure of the material determines the threshold force of an impact that the helmet system 10 will withstand before one or more of the pillars 18a, 18b, 18c, 18d, and 18e begin to be crushed. In the event of an impact which applies a force that is greater than the threshold, one or more of the pillars 18a, 18b, 18c, 18d, and 18e will be crushed thereby deforming irreversibly to absorb the energy of an impact.

Figure 2:
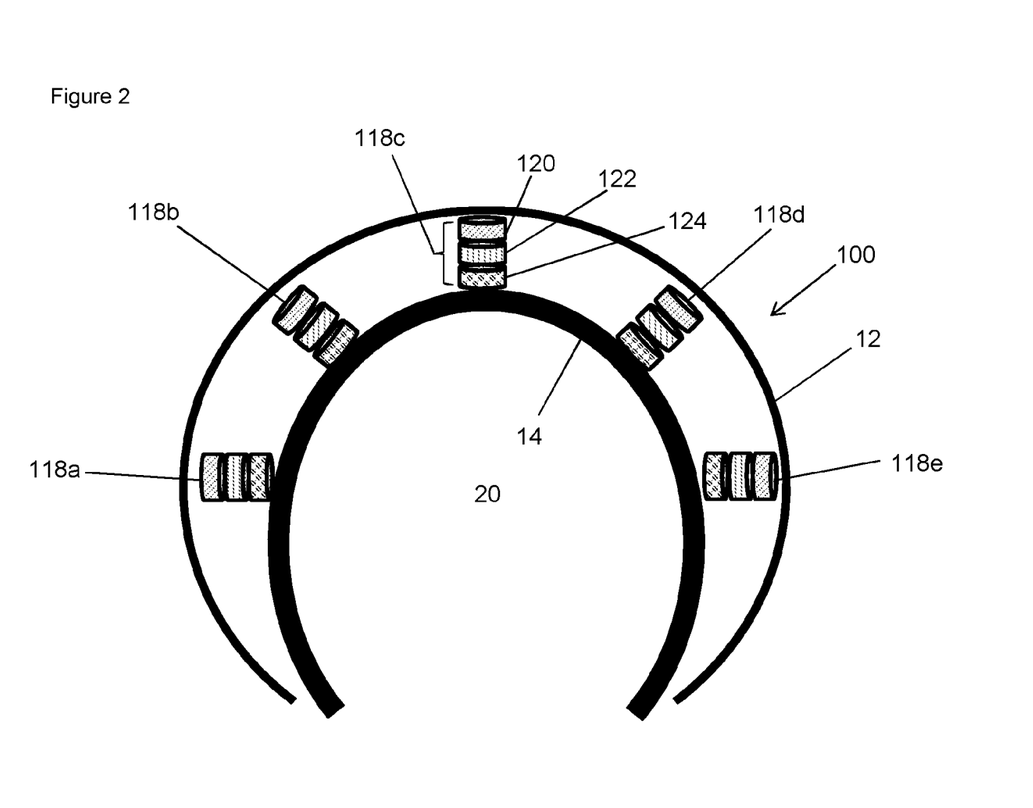
FIG. 2 is a diagrammatic view of a section through another helmet according to the invention.

FIG. 2 shows a section through another helmet 100. As in FIG. 1, the helmet 100 of FIG. 2 comprises an outer shell 12, inner pad 14 and pillars 118a 118b, 118c, 118d and 118e, which are arranged as described above with reference to FIG. 1.

The pillars 118a, 118b, 118c, 118d and 118e of FIG. 2 each comprise three parts 120, 122 and 124. The parts 120, 122, 124 are arranged in a stacked formation so that a first part 120 is nearest to the outer shell, a second part 124 is nearest to the inner pad 14, and a third part 122 lies between the first and second parts 120 and 124. These parts 120, 122 and 124 are each selected to have different deformation threshold pressures so that the pillars have a threshold pressure which is lower near to the helmet shell 12 and higher near to the inner pad 14.

Although FIG. 1 and FIG. 2 show complete helmets 10, 100 embodiments of the disclosure provide helmet inserts which may be used as parts of helmet systems according to the invention. For example such helmet inserts may not comprise a outer shell, and may be configured to fit between the head of a user and the shell (and optionally padding) of a helmet system.

The inner pad 14 in FIG. 1 and FIG. 2 is shown as a single resilient pad, which lies against the head of the user. However, additional or alternative resilient padding structures may be used. The inner padding 14 need not lie only between the pillars of rigid material and the head, but may also be distributed elsewhere in the helmet system. For example, padding may be arranged between the pillars 18a to 18e and the outer shell 12. In some examples resilient padding may be provided around or between the pillars 18a to 18e so that, in the event that one or more of the pillars is irreversibly deformed, the resilient padding continues to support the outer shell 12 of the helmet 10.

The pillars 18, 118 are described as being evenly distributed about the helmet 10, 100 however this is optional and other spatial distributions of the pillars may be used.

The pillars 18, 118 are described as being frustoconical members, however other shapes of pillars such as pyramids may be used. In some cases the pillars may have a narrow intermediate portion, like a waist. A pillar may comprise any structure which supports the outer shell of the helmet spaced from the head of a user. The pillars may have any shape, and may have a width or length greater than their height, for example a pillar may comprise a ridge or strip having a height that at least partially spans the gap between the cavity inner pad 14 and the shell 12 and a length greater than its height.

The pillars 18a, 18b, 18c, 18d, and 18e need not consist solely of a single open-cell material, and mixtures of different materials may be used to provide the pillars. In some examples the pillars may comprise resilient material in addition to the solid open cell foam material.

FIGS. 1 and 2 provide two examples of structures which provide impact absorbing structures having more than one threshold pressure. Other examples include using a foam which has a variation in density so that the density of the pillar increases from its base near the cavity to its tip near the shell 12. This variation in density may be continuous, or it may be provided by discrete steps or changes. In some examples a structure having more than one threshold pressure may be provided by a pillar which comprises cavities in addition to those which exist in the foam. Such cavities may be cut into the foam, for example by drilling, or they may be moulded into foam when the structure of the pillar is formed.

Figure 3:
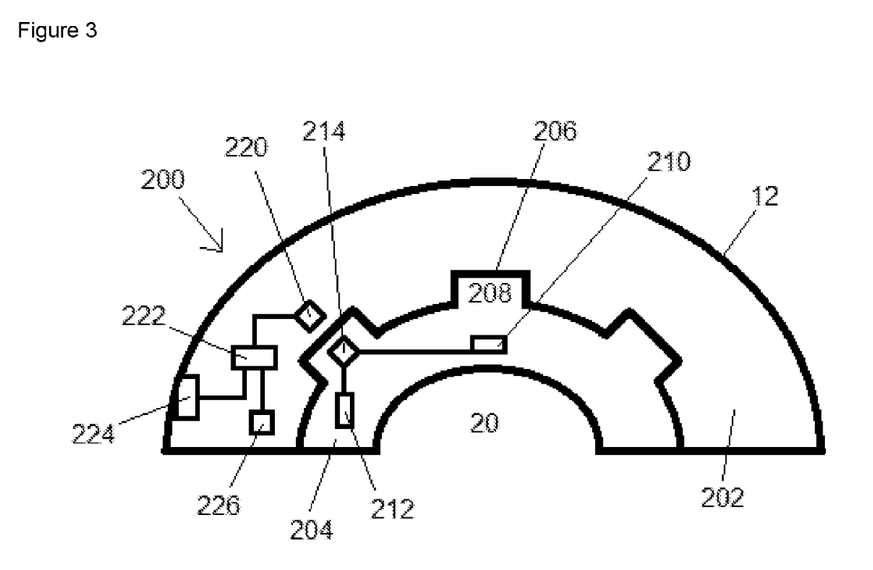
FIG. 3 shows a diagram of a section through a helmet system according to the invention.

FIG. 3 shows a section through a helmet system 200 comprising an outer casing 202 having a hard outer shell 12. A removable insert 204 is adapted to be inserted between the casing and a cavity 20 for receiving the head of a user.

The removable insert 204 comprises a solid open-cell foam material arranged to deform irreversibly in the event of an impact which applies a pressure greater than a selected threshold pressure to absorb the energy of the impact.

The insert 204 comprises a data recorder 210 and an impact sensor 212 configured to sense impacts applied to the insert 204. The impact sensor 212 is coupled to the data recorder 210 for recording sensed impact data. The data recorder 210 and the impact sensor 212 are coupled to a communication interface 214 to enable sensor data to be provided from the removable insert 204. The removable insert 204 comprises keying features 208 for aligning the removable insert with respect to the outer casing 202.

The outer casing 202 comprises a keyed inner surface having keying recesses 206. The keying features 208 of the insert are arranged to be complementary with the keying features of the outer casing 202 and arranged to be at least partially asymmetric or irregular so, when the removable insert 204 is seated in the outer casing 202, the orientation and position of the removable insert 204 with respect to the outer casing is determined by the keying features 206, 208.

The casing 202 comprises a first communication interface 220, a second communication interface 224, a controller 222, and an impact sensor 226. The first communication interface 220 is arranged for communicating with the communication interface 214 of the insert 204. The second communication interface 224 comprises a wireless communication interface, which may communicate using any radio frequency protocol such as BLUETOOTH® or WIFI®. The controller 222 is arranged to obtain sensor data from the removable insert 204 via the first communication interface 220, and from the impact sensor 226 in the casing 202, and to transmit the sensor data to a remote device via the second communication interface 224.

In operation the sensor 212 of the removable insert 204, and the sensor 226 of the casing 202 sense impacts, and the controller 222 transmits messages comprising the impact data via the communication interface 224. The data recorder 210 of the removable insert also records impact data to provide a record of the impacts applied to the removable insert 204.

The data recorder 210 can be interrogated via the communication interface 214 to determine whether the insert 204 has been subjected to impacts which applied pressures greater than a selected threshold (for example, the threshold pressure of the open cell foam material in the insert, thereby enabling a user to determine whether the insert has been damaged, or whether it may be re-used.

The casing 202 may further comprise a resilient material to provide padding. In addition, the casing 202 may comprise pillars of open cell foam material having the features described above with reference to FIG. 1 and FIG. 2. The casing 202 of FIG. 3 is shown as comprising a controller, a communication interface, a sensor and so forth, but these are optional. The helmet casing need not comprise any sensors or other electronics. The helmet casing may comprise conformal sensors for monitoring the casing.

FIG. 3 illustrates functionality of the controller, the sensor, and the communication interface using functional units. However, this does not imply any particular structural arrangement of this functionality. The functionality may be provided by components distributed throughout the casing, or integrated within a single unit, or shared between a number of units. Any spatial configuration of these functional elements may be used. By way of example, the sensors may be located in or on the shell; in or on the inner pad; and/or in or on the crushable open-cell material. It will further be appreciated that different combinations of such locations may be used so as to best monitor the impacts being received by the helmets, and the head of a wearer. In this way, it is also possible to monitor and tailor the open-cell material to reduce impact energy transfer.

The first communication interface 220 of the casing may comprise an inductive coupling, such as a near field RF coupling, for coupling to an inductive coupling 214 of the insert. The insert and casing may additionally or alternatively comprise ohmic connectors, or capacitive couplings for communicating data between the insert and the casing.

Where the insert 214 comprises an inductive coupling it may be operable to provide power to the sensor and or the data recorder. As noted above, the illustration shown in FIG. 3 does not imply any particular structural arrangement of the elements of the insert. For example a smart tissue may be arranged to provide variations in electrical resistance in response to impacts. Such a tissue may be distributed about the material of the insert 204. The sensors may alternatively or additionally comprise accelerometers, which may comprise microelectromechanical MEM accelerometers. Other sensors may be used.

The removable insert 204 may also comprise resilient padding, and the padding and the solid open cell foam material may be arranged in the insert in configurations similar to those described above with reference to FIG. 1 and FIG. 2.

Figure 4A:
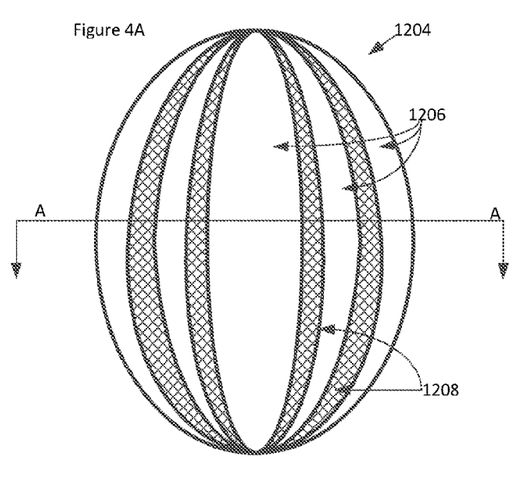
FIG. 4A is a plan view of a helmet liner according to the invention.

FIG. 4A shows a plan view of a helmet liner 1204 comprising regions of resilient padding 1206 and regions of a spacer 1208.

The regions of padding 1206 and spacer 1208 are interleaved together. The padding 1206, and spacer 1208 are arranged to support an outer helmet so that it spaced from the head of a human wearer The spacer 1206 is more rigid than the padding 1208, whilst the padding 1208 is arranged to compress resiliently under compressive force. The spacer 1206 is arranged to compress less than the padding under a compressive force up to a certain threshold force. Above that threshold force, the spacer is configured to compress more than the padding. This can be achieved by the spacer collapsing irreversibly in response to a force greater than the threshold force.

If the spacer 1208 collapses, because the spacer 1208 and padding 1206 are interleaved, the collapse of the spacer 1208 leaves voids in the padding 1206. The padding 1206 can then continue to support the helmet spaced apart from the head of the wearer in order to cushion the wearer against subsequent impacts.

FIG. 4A illustrates one particular example of how the padding 1206 and the spacer 1208 can be interleaved. In FIG. 4A, the spacer 1208 is arranged in elongate strips interleaved between strips of padding 1206. The transverse cross section of these strips is shown inset (illustrating a section through the liner along the line A-A). As shown, these strips may provide tapered pillars, broader at the base toward the wearer's head, than at their top, toward the helmet.

Tapering the cross section of the pillar strips in this way is one way to arrange the spacer 1208 so that it collapses gradually, or in stages. For example under a first level of compressive force, a first part of the spacer 1208 collapses according to the breaking stress of the spacer and the cross sectional area it presents to the force. As a result, part of the spacer remains intact, and the part of the spacer 1208 that remains intact is determined by the strength of the force, the breaking stress of the spacer material, and the cross sectional area that the spacer 1208 presents to the force. Similar function may be provided by graduating the density of the spacer so that it is more dense towards the head of the wearer, and less dense towards the helmet.

FIG. 4B illustrates possible ways of interleaving the spacer 1208 and the padding 1206.

Figure 4B:
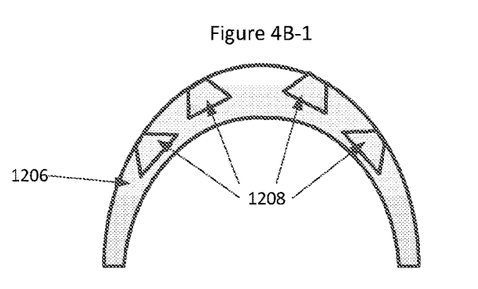

As shown in FIG. 4B-1, the regions of spacer 1208 may be interleaved in the padding by being seated in the padding 1206 so that the padding 1206 lies between the spacer 1208 and the head of the wearer. The padding 1206 may wholly or partially surround the sides of the regions of spacer 1208. In FIG. 4B-1 the spacer 1208 is shown as being flush with the padding 1206 at the upper surface 1206 of the padding (the surface that is to be presented to the helmet). However the spacer 1208 may protrude from the padding.

Figure 4B:
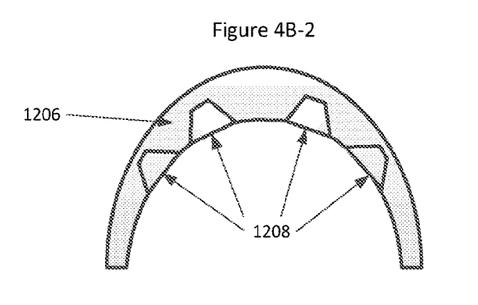

As shown in FIG. 4B-2, the spacer 1208 may be interleaved with the padding 1206 so that the padding 1206 lies between the spacer regions 1208 and the surface of the liner that is presented to the helmet. In FIG. 4B-1 the regions of spacer 1208 abut the surface of the helmet liner 1204 that is presented to the head of the wearer.

Figure 4B:
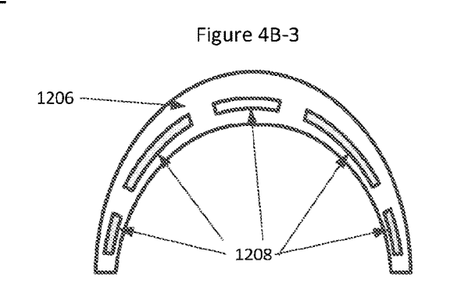
Figure 4B:
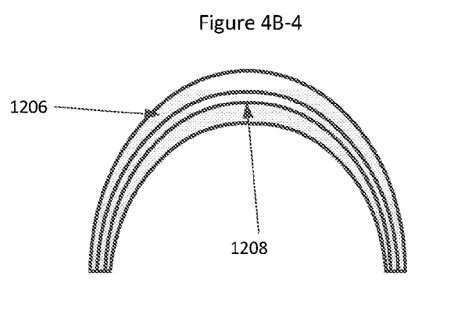

As shown in FIG. 4B-3, regions of the spacer 1208 may be interleaved with the padding so that they are wholly surrounded by the padding 1206.

As shown in FIG. 4B-4, the spacer 1208 and padding 1206 may be interleaved by arranging the padding 1206 and spacer 1208 in layers. For example, the layers may be arranged so that at least one layer of either spacer or padding is arranged between adjacent layers of either padding or spacer respectively in a "sandwich" type configuration. Multiple layers may be used.

The configurations illustrated in FIG. 4B are just examples of interleaving, and other ways of interleaving the two materials may also be used, for example fingers of the two materials may be interdigitated or interwoven, and pieces of the spacer may be embedded in the padding in irregular configurations. Other examples of interleaving materials will be apparent to the skilled person in the context of the present disclosure. It is anticipated that the examples of interleaving shown may be used in FIG. 4B may be used in combination with each other.

The helmet liner 1204 described with reference to FIG. 4 may comprise any of the features of the insert described above. In particular the helmet liner may comprise the keyed surface and/or the sensor and data recorder features described with reference to FIGS. 1 to 3.

The invention claimed is:

1. A helmet comprising:
   (i) an outer shell;
   (ii) an inner pad configured to deform resiliently to cushion the head of a user; and
   (iii) a solid open-cell phenolic resin foam structure,
   wherein the outer shell is spaced apart from the inner pad by the solid open-cell phenolic resin foam structure and wherein the solid open-cell phenolic resin foam structure is arranged to deform irreversibly to absorb the energy of an impact which applies a pressure greater than a selected threshold pressure of the solid open-cell phenolic resin foam structure.

2. The helmet of claim 1, wherein the solid open-cell phenolic resin foam structure is a frangible foam material.

3. The helmet of claim 2, wherein the solid open-cell phenolic resin foam structure deforms irreversibly by crushing or crumbling.

4. The helmet of claim 2, wherein the solid open-cell phenolic resin foam structure is resistant to deflection under load and does not collapse under pressures of up to 70 G.

5. The helmet of claim 2, wherein the inner pad is spaced apart from the outer shell by a plurality of pillars of the solid open-cell phenolic resin foam structure.

6. The helmet of claim 5, wherein at least one of: (i) the cross-sectional area of the pillars is selected according to the breaking stress of the solid open-cell phenolic resin foam structure and the selected threshold pressure; (ii) one or more of the pillars has more than one threshold pressure; and (iii) different pillars have a different threshold pressure.

7. The helmet of claim 2, wherein the solid open-cell phenolic resin foam structure comprises a first portion having a lower threshold pressure to a second portion of the solid open-cell phenolic resin foam structure, and wherein the first and second portions are stacked together.

8. The helmet of claim 1, comprising one or more voids between the outer shell and the inner pad.

9. The helmet of claim 8, wherein the solid open-cell phenolic resin foam structure comprises one or more cavities, and wherein at least one of a size and a spatial distribution of the one or more cavities is selected according to the breaking stress of the impact-absorbing material and the selected threshold pressure.

10. The helmet of claim 1, wherein the inner pad is formed from an elastic material.

11. The helmet of claim 10, wherein the inner pad includes at least one of a soft foam material made from expanded polypropylene, expanded polyethylene, or expanded polyurethane.

12. The helmet of claim 1, wherein the inner pad is adapted to the shape of the head of the user.

13. The helmet of claim 1, further comprising:
a sensor adapted to sense impacts, and a communication interface adapted to communicate impact data to a remote device.

14. A method of monitoring impact energy transfer comprising use of the helmet of claim 13.

15. The helmet of claim 13, further comprising:
a controller adapted to send a signal to the remote device in the event of an impact which applies a pressure greater than a selected threshold pressure.

16. The helmet of claim 13, further comprising:
a data recorder operable to record data from the sensor.

17. A method of reducing impact energy transfer to the head of a user comprising use of the helmet of claim 1.

18. A helmet comprising:
(i) an outer shell;
(ii) an inner pad configured to deform resiliently to cushion the head of a user; and
(iii) a solid open-cell phenolic resin foam structure,
wherein the outer shell is spaced apart from the inner pad by the solid open-cell phenolic resin foam structure and wherein the solid open-cell phenolic resin foam structure is arranged to deform irreversibly to absorb the energy of an impact which applies a pressure greater than a selected threshold pressure of the solid open-cell phenolic resin foam structure, and
wherein the solid open-cell phenolic resin foam structure includes a finely-divided particulate reinforcing material including at least one of clays, clay minerals, talc, vermiculite, metal oxides, refractories, solid or hollow glass microspheres, fly ash, coal dust, wood flour, grain flour, nut shell flour, silica, mineral fibres, finely chopped glass fibre, finely divided asbestos, chopped fibres, finely chopped natural or synthetic fibres, ground plastics and resins whether in the form of powder or fibres, reclaimed waste plastics and resins, pigments, powdered paint, carbon black, and starches.

19. A helmet comprising:
(i) an outer shell;
(ii) an inner pad configured to deform resiliently to cushion the head of a user; and
(iii) a solid open-cell phenolic resin foam structure,
wherein the outer shell is spaced apart from the inner pad by the solid open-cell phenolic resin foam structure and wherein the solid open-cell phenolic resin foam structure is arranged to deform irreversibly to absorb the energy of an impact which applies a pressure greater than a selected threshold pressure of the solid open-cell phenolic resin foam structure, and
wherein the solid open-cell phenolic resin foam structure has a density in the range of 100 to 500 kg·m$^{-3}$.

20. A helmet comprising:
(i) an outer shell;
(ii) an inner pad configured to deform resiliently to cushion the head of a user; and
(iii) a solid open-cell phenolic resin foam structure,
wherein the outer shell is spaced apart from the inner pad by the solid open-cell phenolic resin foam structure and wherein the solid open-cell phenolic resin foam structure is arranged to deform irreversibly to absorb the energy of an impact which applies a pressure greater than a selected threshold pressure of the solid open-cell phenolic resin foam structure, and
wherein the solid open-cell phenolic resin foam structure has an average cell diameter in the range of from about 0.5 mm to 5 mm.

21. A helmet system comprising:
(i) a helmet comprising an outer casing; and
(ii) a removable insert adapted to be inserted between the outer casing and the head of a user, wherein the removable insert comprises a solid open-cell phenolic resin foam structure, arranged to deform irreversibly to absorb the energy of an impact which applies a pressure greater than a selected threshold pressure of the solid open-cell phenolic resin foam structure.

22. The helmet of claim 21, further comprising:
an inner pad positioned inside the casing, wherein the inner pad is configured to deform resiliently to cushion the head of a user.

23. A helmet liner comprising:
resilient padding; and
a rigid spacer interleaved with the resilient padding to support an outer helmet spaced apart from the head of a wearer, when in use,
wherein the resilient padding is arranged to compress resiliently under compressive force less than or equal to a first force threshold, and
the rigid spacer is arranged to compress less than the resilient padding under a compressive force less than a second threshold force less than the first threshold force, and to collapse irreversibly in response to a force greater than the second threshold force leaving voids interleaved with the resilient padding, and
wherein the rigid spacer is a solid open-cell phenolic resin foam.

* * * * *

UNITED STATES PATENT AND TRADEMARK OFFICE
CERTIFICATE OF CORRECTION

Page 1 of 1

PATENT NO. : 11,122,848 B2
APPLICATION NO. : 14/888120
DATED : September 21, 2021
INVENTOR(S) : Aldino Albertelli and Riccardo Cioni It is certified that error appears in the above-identified patent and that said Letters Patent is hereby corrected as shown below:

On the Title Page

Column 1, Line 30 Item (30):
"Foreign Application Priority Data: Apr. 30, 2013 (GB) ........ 1307815"

Should read:
--Foreign Application Priority Data: Apr. 30, 2013 (GB) ........ 1307815.9--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*